(12) United States Patent
Kang

(10) Patent No.: US 11,755,493 B2
(45) Date of Patent: Sep. 12, 2023

(54) MEMORY CONTROLLER FOR SELECTING VICTIM MAP CACHE LINE AND OPERATING METHOD THEREOF

(71) Applicant: SK hynix Inc., Icheon (KR)

(72) Inventor: Won Kyung Kang, Icheon (KR)

(73) Assignee: SK hynix Inc., Icheon (KR)

( * ) Notice: Subject to any disclaimer, the term of this patent is extended or adjusted under 35 U.S.C. 154(b) by 75 days.

(21) Appl. No.: 17/467,062

(22) Filed: Sep. 3, 2021

(65) Prior Publication Data

US 2022/0309003 A1   Sep. 29, 2022

(30) Foreign Application Priority Data

Mar. 23, 2021   (KR) .................. 10-2021-0037523

(51) Int. Cl.
| | |
|---|---|
| *G06F 12/0888* | (2016.01) |
| *G06F 12/0873* | (2016.01) |
| *G06F 12/0891* | (2016.01) |
| *G06N 3/08* | (2023.01) |
| *G06F 12/02* | (2006.01) |
| *G06F 18/214* | (2023.01) |

(52) U.S. Cl.
CPC ...... *G06F 12/0888* (2013.01); *G06F 12/0246* (2013.01); *G06F 12/0873* (2013.01); *G06F 12/0891* (2013.01); *G06F 18/214* (2023.01); *G06N 3/08* (2013.01); *G06F 2212/7201* (2013.01)

(58) Field of Classification Search
CPC ............. G06F 12/0888; G06F 12/0246; G06F 12/0873; G06F 12/0891; G06F 18/214; G06F 2212/7201; G06F 12/1009; G06F 12/0811; G06F 12/1027; G06F 2212/312; G06F 2212/657; G06N 3/08; G06N 3/063; G06K 9/6256

See application file for complete search history.

(56) References Cited

U.S. PATENT DOCUMENTS

| | | | |
|---|---|---|---|
| 9,621,681 B2 | 4/2017 | Edwards et al. | |
| 11,373,062 B1* | 6/2022 | Wang | G06V 10/82 |
| 2009/0193193 A1* | 7/2009 | Kern | G06F 11/1441 |
| | | | 711/E12.008 |
| 2017/0337133 A1* | 11/2017 | Bolbenes | G06F 12/126 |
| 2019/0108136 A1* | 4/2019 | Park | G06F 12/0871 |

(Continued)

FOREIGN PATENT DOCUMENTS

KR   10-2018-0070974 A   6/2018

*Primary Examiner* — Tasnima Matin

(57) ABSTRACT

A memory controller includes: a map cache area for storing a map cache lines including mapping information between a logical address and a physical address; a victim map cache line selector for selecting a victim map cache line among the map cache lines, using a victim map cache line selection model trained by using a storage state information as training data, when a physical address corresponding to a logical address of an operation request is absent in the map cache area; and a map data controller for removing the selected victim map cache line from the map cache area, providing the removed victim map cache line to a memory device, receiving a target map cache line including the physical address corresponding to the logical address of the operation request from the memory device, and storing the target map cache line in the map cache area.

20 Claims, 17 Drawing Sheets

(56) References Cited

U.S. PATENT DOCUMENTS

2019/0155733 A1* 5/2019 Hagersten ............ G06F 12/0811
2020/0371934 A1* 11/2020 Chachad ............. G06F 12/0815
2021/0374523 A1* 12/2021 Gottin ...................... G06N 3/04
2022/0066946 A1* 3/2022 Kotra ................... G06F 12/0848
2022/0222231 A1* 7/2022 Dong .................... G06F 16/252

* cited by examiner

MEMORY CONTROLLER FOR SELECTING VICTIM MAP CACHE LINE AND OPERATING METHOD THEREOF

CROSS-REFERENCE TO RELATED APPLICATION

The present application claims priority under 35 U.S.C. § 119(a) to Korean patent application number 10-2021-0037523 filed on Mar. 23, 2021, in the Korean Intellectual Property Office, the entire disclosure of which is incorporated by reference herein.

BACKGROUND

1. Technical Field

The present disclosure generally relates to an electronic device, and more particularly, to a memory controller and an operating method thereof.

2. Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a memory controller capable of improving the performance of a storage device by minimizing a map data loading operation, and an operating method of the memory controller.

In accordance with an aspect of the present disclosure, there is provided a memory controller for controlling a memory device, the memory controller including: a map cache area configured to store a plurality of map cache lines including mapping information between a logical address provided by a host and a physical address of the memory device; a victim map cache line selector configured to select a victim map cache line to be removed from the map cache area among the plurality of map cache lines, using a victim map cache line selection model, when a physical address corresponding to a logical address of an operation request provided by the host is absent in the map cache area, the victim map cache line selection model being trained by using a plurality of storage state information as training data; and a map data controller configured to remove the selected victim map cache line from the map cache area, provide the removed victim map cache line to the memory device, receive a target map cache line including the physical address corresponding to the logical address of the operation request from the memory device, and store the target map cache line in the map cache area.

In accordance with another aspect of the present disclosure, there is provided a method of operating a memory controller including a map cache area for storing a plurality of map cache lines, the method including: acquiring current storage state information; preprocessing the current storage state information; and selecting a victim map cache line from among the plurality of map cache lines based on the preprocessed current storage state information, using a victim map cache line selection model that is trained by using a plurality of storage state information as training data, the victim map cache line being to be removed from the map cache area.

In accordance with still another aspect of the present disclosure, there is provided a storage device including: a memory device configured to store map data including mapping information between a logical address provided by a host and a physical address thereof; a buffer memory including a map cache area configured to store a plurality of map cache lines including a portion of the map data; and a memory controller configured to select a victim map cache line from among the plurality of map cache lines using a victim map cache line selection model trained by using a plurality of storage state information as training data, when a physical address corresponding to a logical address of an operation request provided by the host is absent in the map cache area, remove the selected victim map cache line from the map cache area and then provide the removed victim map cache line to the memory device, and control the buffer memory to receive, from the memory device, a target map cache line including the physical address corresponding to the logical address of the operation request and then store the received target map cache line in the map cache area.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
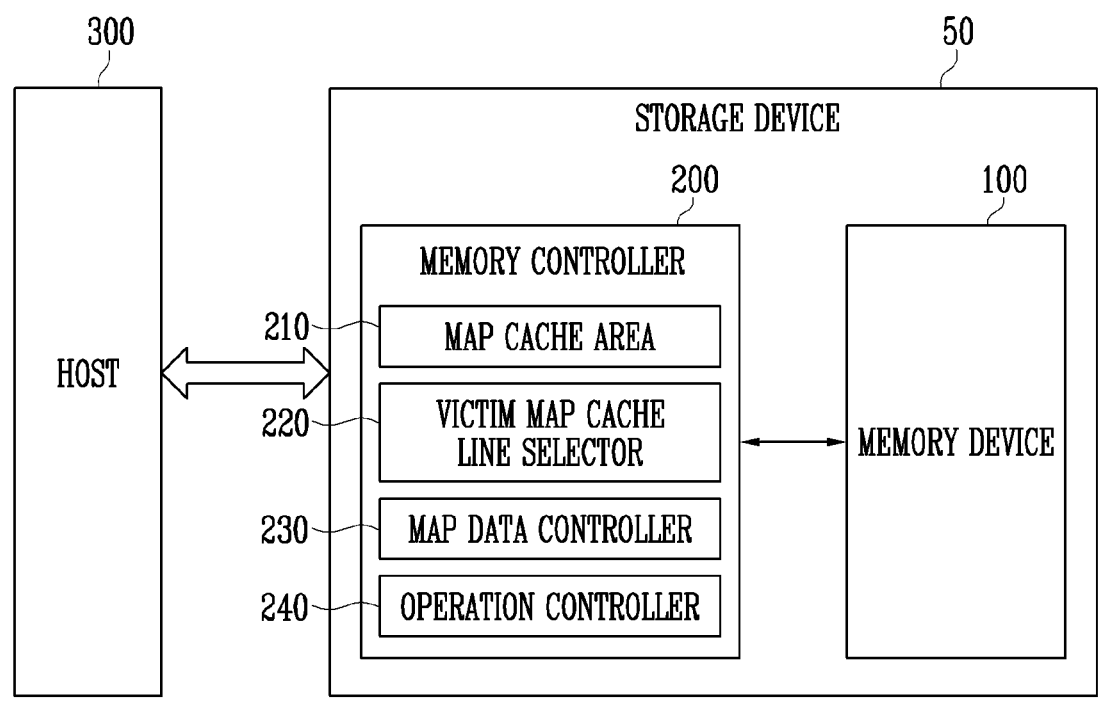
FIG. 1 is a diagram illustrating a storage device in accordance with an embodiment of the present disclosure.

FIG. 1 illustrates a storage device 50 in accordance with an embodiment of the present disclosure.

Referring to FIG. 1, the storage device 50 may include a memory device 100 and a memory controller 200 for controlling an operation of the memory device 100. The storage device 50 may be a device for storing data under the control of a host 300 such as a mobile phone, a smart phone, an MP3 player, a laptop computer, a desktop computer, a game console, a TV, a tablet PC, an in-vehicle infotainment system, or the like.

The storage device 50 may be manufactured as any one of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate under the control of the memory controller 200. The memory device 100 may include a memory cell array (not shown) including a plurality of memory cells for storing data.

Each of the memory cells may be configured as any one of a Single Level Cell (SLC) storing one-bit data, a Multi-Level Cell (MLC) storing two-bit data, a Triple Level Cell (TLC) storing three-bit data, and a Quadruple Level Cell (QLC) storing four-bit data.

The memory cell array (not shown) may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command CMD and an address ADDR from the memory controller 200, and access a an area selected by the address ADDR in the memory cell array. The memory device 100 may perform an operation indicated by the command CMD on the area selected by the address ADDR. For example, the memory device 100 may perform a write operation (or program operation), a read operation, and an erase operation. In the program operation, the memory device 100 may program data in the area selected by the address ADDR. In the read operation, the memory device 100 may read data from the area selected by the address ADDR. In the erase operation, the memory device 100 may erase data stored in the area selected by the address ADDR.

In an embodiment, the memory device 100 may store map data including mapping information between a logical address provided by the host 300 and a physical address corresponding to the logical address.

The memory controller 200 may control overall operations of the storage device 50.

When power is applied to the storage device 50, the memory controller 200 may execute firmware (FW). When the memory device 100 is a flash memory device, the FW may include a host interface layer (HIL) for controlling communication with the host 300, a flash translation layer (FTL) for controlling communication between the host 300 and the memory device 100, and a flash interface layer (FIL) for controlling communication with the memory device 100.

In an embodiment, the memory controller 200 may receive data and a Logical Block Address (LBA) from the host 300, and translate the LBA into a Physical Block Address (PBA) representing addresses of memory cells included in the memory device 100, in which the data is to be stored. In this specification, the LBA and a "logic address" or "logical address" may be used with the same meaning. In this specification, the PBA and a "physical address" may be used with the same meaning.

The memory controller 200 may control the memory device 100 to perform a program operation, a read operation, an erase operation, or the like in response to a request from the host 300. In the program operation, the memory controller 200 may provide a write command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of any request from the host 300, and transmit the command, the address, and the data to the memory device 100. For example, the memory controller 200 may provide the memory device 100 with a command, an address, and data, which are used to perform read and program operations accompanied in performing wear leveling, read reclaim, garbage collection, etc.

In an embodiment, the memory controller 200 may control at least two memory devices 100. The memory controller 200 may control the memory devices 100 according to an interleaving scheme so as to improve operational performance. The interleaving scheme may be a scheme for controlling operations on at least two memory devices 100 to overlap with each other.

The memory controller 200 may acquire a physical address corresponding to an input a logical address input according to a request of the host 300, and perform an operation of storing data in a memory region indicated by the acquired physical address or reading data stored in the memory region indicated by the acquired physical address. In order for the memory controller 200 to perform an operation on the memory device 100, the memory controller 200 acquires a physical address corresponding to a logical address as an object on which the operation is to be performed. Since map data is stored in the memory device 100, the memory controller 200 reads a plurality of map cache lines including mapping information on the logical address at which the operation is to be performed, and acquires a physical address from the plurality of map cache lines so as to acquire the mapping information before the operation is performed. The map cache line may be a cache line including mapping information having a given size, and the map cache line may be a unit of map data transfer between the memory controller 200 and the memory device 100.

In an embodiment, the memory controller 200 may include a map cache area 210, a victim map cache line selector 220, a map data controller 230, and an operation controller 240.

The map cache area 210 may temporarily store a plurality of map cache lines. In an embodiment, the map cache area 210 may be implemented with a memory, a register, or the like.

The victim map cache line selector 220 may select a victim map cache line when a physical address corresponding to a logical address at which the memory controller 200 is to perform an operation does not exist in the map cache area 210. The victim map cache line may be a map cache line to be removed or evicted from the map cache area 210 so as to read a new map cache line from the memory device 100 and then store the read map cache line in the map cache area 210. In an embodiment, the victim map cache line selector 220 may be implement with one or more processors.

The map data controller 230 may read map data from the memory device 100 and store the read map data in the map cache area 210. Alternatively, the map data controller 230 may store, in the memory device 100, map data stored in the map cache area 210. In an embodiment, the map data controller 230 may remove a victim map cache line from the map cache area 210 when a physical address corresponding to a logical address at which the memory controller 200 is to perform an operation does not exist in the map cache area 210. The map data controller 230 may provide the victim map cache line removed from the map cache area 210 to the memory device 100, and control the map cache area 210 to read a new map cache line from the memory device 100 and then store the new map cache line in the map cache area 210.

The operation controller 240 may store data in the memory device 100 or read data stored in the memory device 100 in response to a request of the host 300. The operation controller 240 may acquire a physical address corresponding to a logical address input according to the request of the host 300 so as to perform an operation corresponding to the request, e.g., a write operation or a read operation, on the memory device 100 using the physical address. The operation controller 240 may search for the logical address in the map cache area 210. When mapping information corresponding to the logical address is found in the map cache area 210, the operation controller 240 may acquire the physical address from the corresponding mapping information. The operation controller 240 may perform the operation requested by the host 300 on a memory region of the memory device 100 that is indicated by the physical address.

When the mapping information corresponding to the logical address is not found in the map cache area 210, the operation controller 240 may acquire the mapping information from the memory device 100 by controlling the victim map cache line selector 220 and the map data controller 230.

The host 300 may communicate with the storage device 50 using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
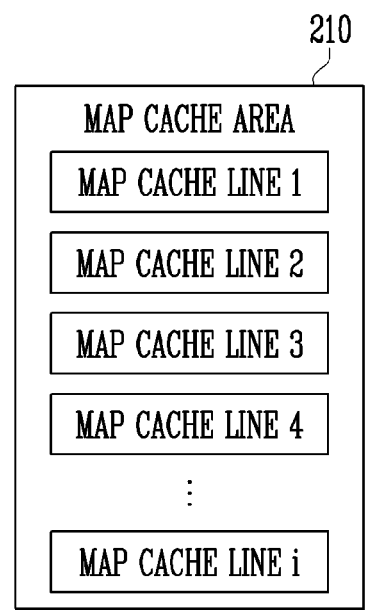
FIG. 2 is a diagram illustrating map cache lines included in a map cache area.

FIG. 2 illustrates map cache lines included in the map cache area 210 of FIG. 1.

Referring to FIG. 2, the map cache area 210 may include a plurality of map cache lines. It is assumed that the map cache area 210 can include i map cache lines, i being a positive integer greater than 1. In an embodiment, each map cache line may have a unique number identifying the map cache line among the plurality of map cache lines. Hereinafter, information on the map cache line may include the unique number of the map cache line.

In an embodiment, the map cache area 210 may temporarily store a portion of map data stored in the memory device 100. One map cache line may include mapping information having a given size. When the portion of the map data is stored in the map cache area 210, the memory controller 200 can more rapidly acquire a physical address corresponding to a logical address, at which the memory controller 200 is to perform a corresponding operation, from the map cache area 210. Thus, the storage device 50 may use the map cache area 210 as a kind of cache memory for the map data.

The memory controller 200 may acquire a physical address corresponding to a logical address input according to a request of the host 300 by searching the map cache area 210. As described above, when the memory controller 200 finds mapping information corresponding to the logical address in the map cache area 210, it may be defined that a cache hit has occurred.

Figure 3:
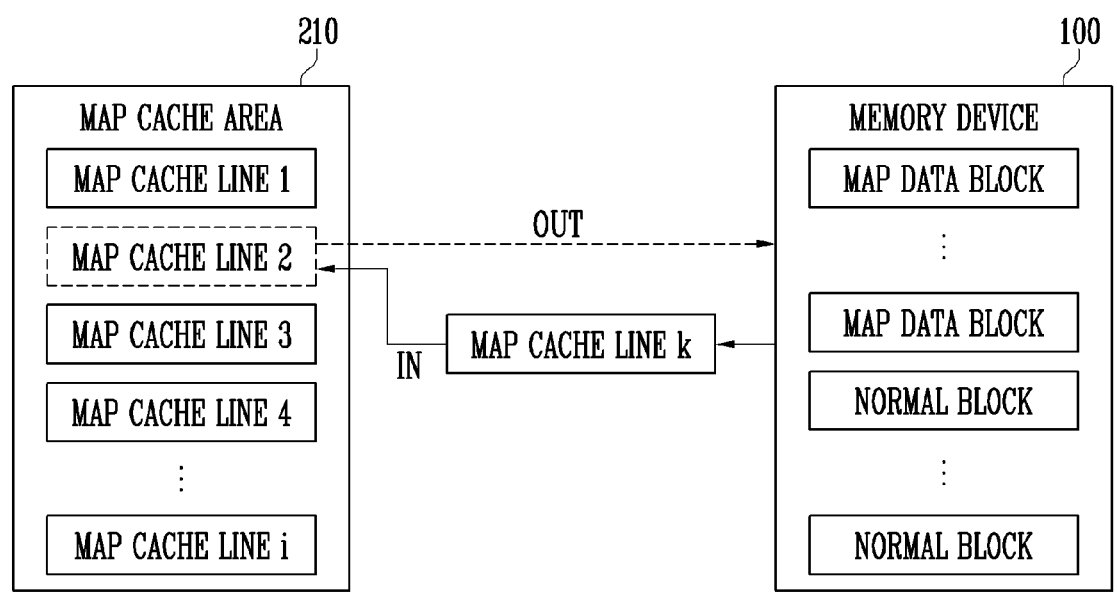
FIG. 3 is a diagram illustrating an operation of removing a victim map cache line from the map cache area.

FIG. 3 illustrates an operation of removing a victim map cache line from the map cache area 210 shown in FIG. 2.

Referring to FIG. 3, the map cache area 210 may include the i map cache lines. In addition, the memory device 100 may include map data blocks and normal blocks. The map data blocks may store the map data. The map data block may include a plurality of map cache lines. The normal blocks may store data requested by the host 300.

In FIG. 3, it is assumed that a necessity to access mapping information corresponding to a logical address that is included in a map cache line k has occurred. Also, it is assumed that the map cache area 210 does not store the mapping information corresponding to the logical address. As described above, when the memory controller 200 does not find the mapping information corresponding to the logical address in the map cache area 210, it may be defined that a cache miss has occurred.

The map cache area 210 can store only the i map cache lines, and hence at least one map cache line is to be removed from the map cache area 210 in order to store a new map cache line in the map cache area 210. For example, a victim map cache line to be removed from the map cache area 210 may be a map cache line which has not been used for the longest time (Least Recently Used (LRU)) among the i map cache lines included in the map cache area 210. In another example, the victim map cache line to be removed from the map cache area 210 may be a map cache line which has least recently been referred (Least Recently Used (LRU)) among the i map cache lines included in the map cache area 210. To this end, the memory controller 200 described with reference to FIG. 1 may store information on a number of times each of the i map cache lines stored in the map cache area 210 has been used and information on a time at which each of the i map cache lines stored in the map cache area 210 has been used.

In FIG. 3, when assuming that a map cache line 2 in the map cache area 210 is a map cache line which has least recently been referred or has not used for the longest time, the map cache line 2 may be removed from the map cache area 210, and the map cache line k read from the memory device 100 may be stored at the position where the map cache line 2 is removed. The map cache line k may be provided from the map data blocks included in the memory device 100. In addition, the map cache line 2 removed from the map cache area 210 may be provided to the map data blocks.

As described above, when the cache miss frequently occurs, the performance of the storage device 50 may be deteriorated due to a map data loading operation. Therefore, it is required to maintain a map cache line having a high probability to be used again in the map cache area 210 and remove a map cache line having a low probability to be used again from the map cache area 210.

In accordance with an embodiment of the present disclosure, a victim map cache line to be removed from the map cache area 210 is selected by using a machine learning-based model, so that the performance of the storage device 50 can be improved by minimizing a number of times the map data loading operation is performed.

Figure 4:
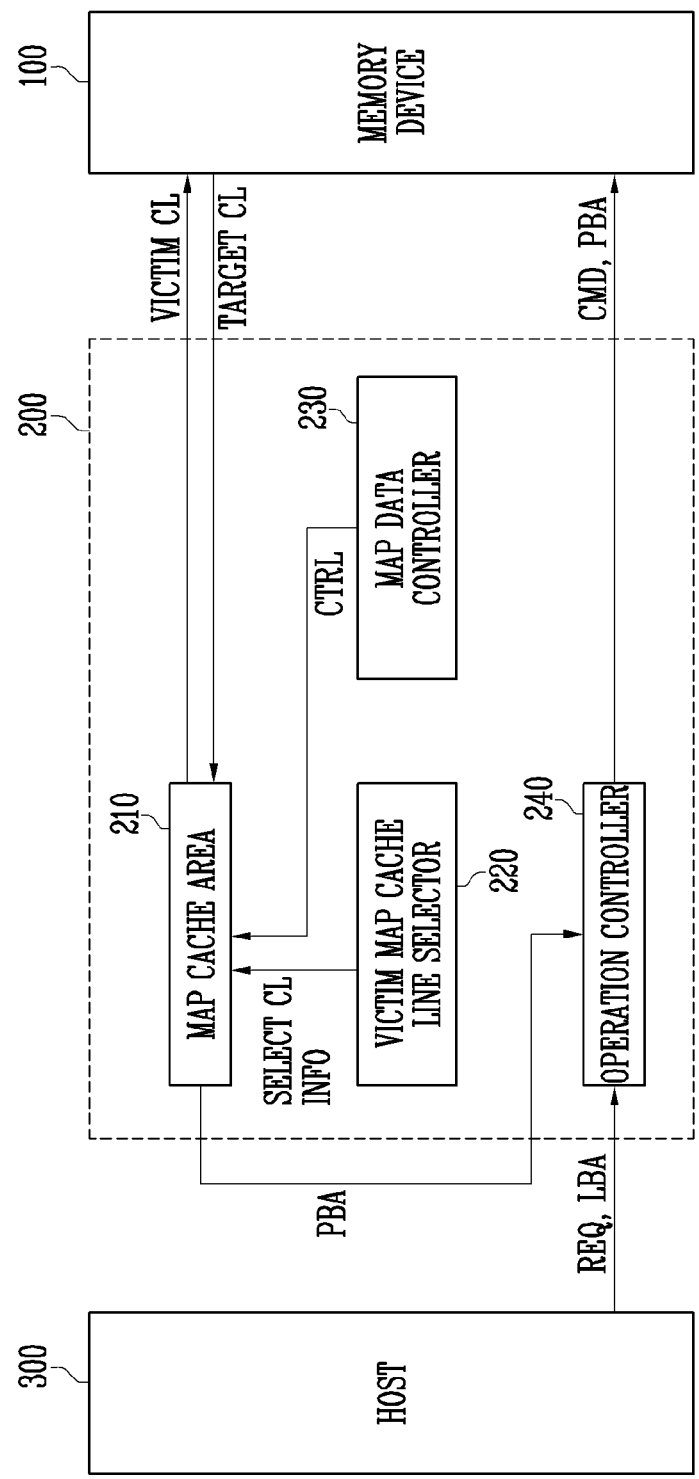
FIG. 4 is a diagram illustrating a memory controller in accordance with an embodiment of the present disclosure.

FIG. 4 illustrates a memory controller 200 in accordance with an embodiment of the present disclosure. The memory controller 200 shown in FIG. 4 may correspond to the memory controller 200 shown in FIG. 1.

Referring to FIG. 4, the memory controller 200 may include a map cache area 210, a victim map cache line selector 220, a map data controller 230, and an operation controller 240.

The map cache area 210 may store a plurality of map cache lines including mapping information between a logical address provided by the host 300 and a physical address of the memory device 100.

The victim map cache line selector 220 may select a victim map cache line VICTIM CL to be removed from the map cache area 210 among the plurality of map cache lines included in the map cache area 210, using a victim map cache line selection model, when a physical address PBA corresponding to a logical address LBA of an operation request REQ provided by the host 300 does not exist in the map cache area 210. The operation request REQ may include a request for a program operation, a request for an erase operation, a request for a read operation, or the like.

In an embodiment, the victim map cache line selection model may be a machine learning-based model trained by using a plurality of storage state information as training data. For example, the victim map cache line selection model may be trained by using reinforcement learning. The victim map cache line selection model may receive current storage state information as state information and output a victim map cache line as action information. In an embodiment, the action information may include a unique number of the victim map cache line.

The storage state information or the state information may include various information representing a state of the storage device 50. Hereinafter, the state of the storage device 50 may be designated as a storage state. For example, the storage state information may include one or more of a logical address of an operation request, a size of data corresponding to the operation request, a type of an operation corresponding to the operation request, an interval at which operation requests are received from the host 300, information on whether a physical address corresponding to the logical address of the operation request has existed in the map cache area 210, information of a cache-hit map cache line among the plurality of map cache lines in the map cache area 210, a number of times the plurality of map cache lines are accessed, a number of map cache lines storable in the map cache area 210, a frequency of an operation of removing the selected victim map cache line from the map cache area 210, and the like. Meanwhile, a description of the above-described storage state information is merely an example, and the storage state information may further include various other information associated with the storage state in addition to the above-described examples.

The storage state information may be different from each other for every time at which the storage state information is input to the victim map cache line selection model. For example, the current storage state information may represent a storage state when a physical address PBA corresponding to a logical address LBA provided with a current operation request REQ does not exist in the map cache area 210. Storage state information corresponding to a previously provided operation request may represent a storage state when a physical address corresponding to a logical address provided with the previously provided operation request does not exist in the map cache area 210.

In an embodiment, training data of the victim map cache line selection model may include a plurality of storage state information. The plurality of storage state information may include storage state information corresponding to a predetermined number of operation requests previously provided by the host 300.

An initial victim map cache line selection model may be a model pre-trained by using arbitrary training data.

In an embodiment, the victim map cache line selector 220 may provide the map cache area 210 with information SELECT CL INFO on the selected victim map cache line.

The map data controller 230 may control the map cache area 210 using a control signal CTRL. For example, the map data controller 230 may control the map cache area 210 to remove the victim map cache line VICTIM CL from the map cache area 210 and to provide the memory device 100 with the victim map cache line VICTIM CL. Also, the map data controller 230 may control the map cache area 210 to receive a target map cache line TARGET CL from the memory device 100 and to store the target map cache line TARGET CL in the map cache area 210. The target map cache line TARGET CL may be a map cache line including the physical address PBA corresponding to the logical address LBA of the current operation request REQ.

The operation controller 240 may acquire the physical address PBA corresponding to the logical address LBA of the current operation request REQ from the plurality of map cache lines included in the map cache area 210 in response to the current operation request REQ. Alternatively, when the physical address PBA corresponding to the logical address LBA of the current operation request REQ does not exist in the map cache area 210, the operation controller 240 may acquire the physical address PBA corresponding to the logical address LBA of the current operation request REQ from the target map cache line TARGET CL.

Also, the operation controller 240 may control the memory device 100 to perform an operation corresponding to the current operation request REQ using the acquired physical address PBA. For example, the operation controller 240 may generate a command CMD instructing the operation corresponding to the current operation request REQ, and provide the memory device 100 with the command CMD and the physical address PBA.

Figure 5:
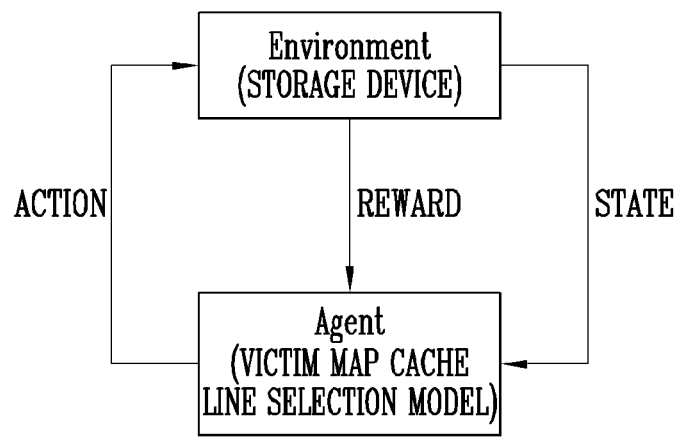
FIG. 5 is a diagram illustrating reinforcement learning applied to a victim map cache line selection model.

FIG. 5 illustrates reinforcement learning applied to the victim map cache line selection model described with reference to FIG. 4.

Referring to FIG. 5, the reinforcement learning may be performed between an agent and an environment. The agent takes a certain action ACTION in a current state STATE, and the environment returns a next state and a current reward REWARD according to the action ACTION to the agent. In this embodiment, the agent may be the victim map cache line selection model, and the environment may be the storage device 50.

The reinforcement learning may aim to find a strategy in which the reward REWARD is maximized. Specifically, in the reinforcement learning, a strategy for determining how the action ACTION is to be taken in the current state STATE may be expressed as a policy, and the aim of training may be to find an optimum strategy or policy. In order to find the optimum policy, the reinforcement learning may use concepts of a state-value function and an action-value function.

The state-value function represents goodness or badness of a current state. A value of the current state may be expressed as an average of the total sum of future rewards, and the importance of a future reward may be changed according to a discount factor given between 0 and 1. The discount factor may be an element for determining the importance of the current reward and the future reward.

Meanwhile, the action-value function represents goodness or badness of a current action. A value determined when taking a certain action expected when following a policy in a certain state may be expressed as an average of the total sum of future rewards, and the importance of a future reward may be changed according to the discount factor. Consequently, the action-value function may quantitatively represent the value of the certain action taken in the current state.

As described above, the reinforcement learning is used to find the optimum policy through the use of the state-value function and the action-value function. In an embodiment, the victim map cache line selection model trained through the reinforcement learning may be implemented by using Q-Learning, an Artificial Neural Network (ANN), etc.

In an embodiment, when current storage state information is input thereto, the victim map cache line selection model may select a victim map cache line from among a plurality of map cache lines in the map cache area 210 of the storage device 50, and output, as a current action, the victim map cache line. The storage device 50 may calculate a current reward with respect to the current action of the victim map cache line selection model. Subsequently, the victim map cache line selection model may receive next storage state information and the current reward. In an embodiment, the action may include determining and outputting a unique number of the victim map cache line.

In an embodiment, the reinforcement learning may be performed until an accumulated reward becomes equal to or greater than a reference value, i.e., until the accumulated reward is maximized. In another embodiment, the reinforcement learning may be performed a predetermined number of training times. One-time training may mean a process in which the victim map cache line selection model selects a victim map cache line with respect to the current storage state information, outputs the selected victim map cache line as an action, and receive, as a result of the action, a reward for the selected victim map cache line that is the action.

Figure 6:
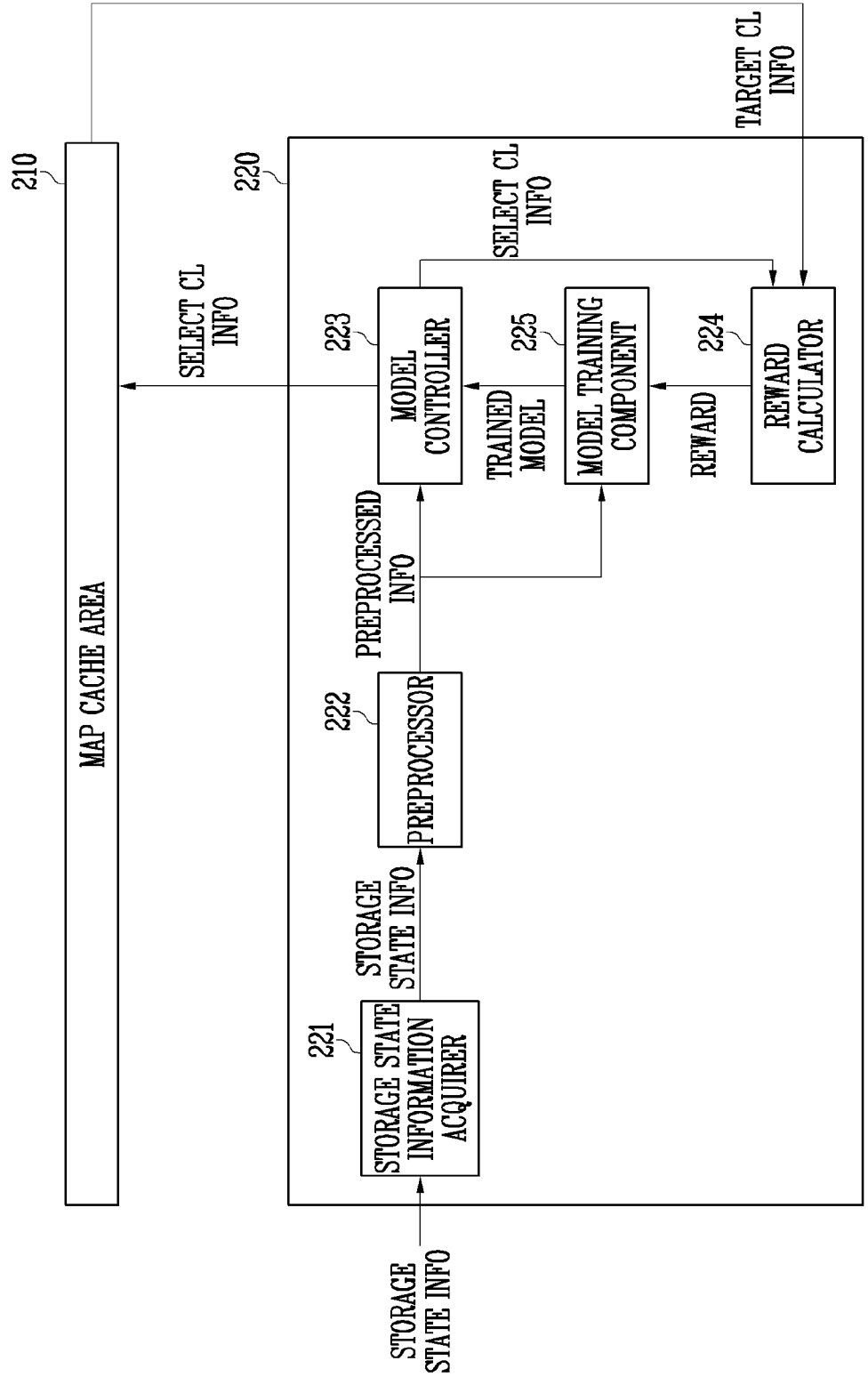
FIG. 6 is a diagram illustrating a victim map cache line selector in accordance with an embodiment of the present disclosure.

FIG. 6 illustrates a victim map cache line selector 220 in accordance with an embodiment of the present disclosure. The victim map cache line selector 220 shown in FIG. 6 may correspond to the victim map cache line selector 220 shown in FIG. 1 or 4.

Referring to FIG. 6, the victim map cache line selector 220 may include a storage state information acquirer 221, a preprocessor 222, a model controller 223, a reward calculator 224, and a model training component 225.

The storage state information acquirer 221 may acquire storage state information of the storage device 50. For example, the storage state information acquirer 221 may acquire current storage state information STORAGE STATE INFO. Accordingly, the storage state information acquirer 221 may store various information associated with a state of the storage device 50. In an embodiment, the current storage state information STORAGE STATE INFO may include information representing a storage state corresponding to each of a current operation request and a predetermined number of previous operation requests before the current operation request.

The storage state information acquirer 221 may provide the current storage state information STORAGE STATE INFO to the preprocessor 222.

The preprocessor 222 may preprocess the current storage state information STORAGE STATE INFO. For example, the preprocessor 222 may perform various preprocessing operations on the current storage state information STORAGE STATE INFO, such as a normalization operation, an outlier removal operation, and a quantizing operation of continuous data. The preprocessor 222 may provide the preprocessed current storage state information PREPROCESSED INFO to the model controller 223 and the model training component 225.

The model controller 223 may select a victim map cache line based on the preprocessed current storage state information PREPROCESSED INFO by using a victim map cache line selection model. The victim map cache line selection model used by the model controller 223 is an activated model, and may be an actual victim map cache line selection model. The actual victim map cache line selection model may be a model which has been completely trained. Therefore, after the victim map cache line is selected, the actual victim map cache line selection model may maintain a function, a parameter, and the like, which have been used to select the victim map cache line, without updating them.

The model controller 223 may provide information SELECT CL INFO on the selected victim map cache line to the map cache area 210 and the reward calculator 224. In an embodiment, the information SELECT CL INFO on the selected victim map cache line may include a unique number identifying the selected victim map cache line.

The reward calculator 224 may calculate a reward value REWARD to be used in training the victim map cache line selection model, based on the information SELECT CL INFO on the selected victim map cache line and information TARGET CL INFO on a target map cache line. In an embodiment, the information TARGET CL INFO on the target map cache line may include a unique number identifying the target map cache line.

In an embodiment, the reward calculator 224 may store a victim map cache line list. The victim map cache line list may include information on previous victim map cache lines selected by the victim map cache line selection model, the previous victim map cache lines being selected while a predetermined number of previous operation requests are provided by the host 300. The predetermined number may be variously set in some embodiments. In an embodiment, the information on the previous victim map cache lines may include unique numbers identifying the previous victim map cache lines. The reward calculator 224 may store unique numbers of previous victim map cache lines selected for a certain period of time.

In an embodiment, the reward calculator 224 may receive the information TARGET CL INFO on the target map cache line from the map cache area 210. The reward calculator 224 may calculate the reward value REWARD according to whether the target map cache line exists in the victim map cache line list. For example, when a unique number of the target map cache line does not exist in the victim map cache line list, the reward calculator 224 may output a high reward value as the reward value REWARD. The high reward value may mean a positive reward value or an affirmative reward value. On the other hand, when the unique number of the target map cache line exists in the victim map cache line list, the reward calculator 224 may output a low reward value as the reward value REWARD. The low reward value may mean a negative reward value or a pessimistic reward value. The reward calculator 224 may provide the reward value REWARD to the model training component 225.

The model training component 225 may additionally train a training model based on the reward value REWARD. The training model may be a machine learning-based victim map cache line selection model. Accordingly, in the training model, a function, a parameter, and the like used to select a victim map cache line may be updated whenever the victim map cache line is selected. That is, the model controller 223 may select a victim map cache line by using the actual victim map cache line selection model, and the model training component 225 may perform additional training by using the training model.

In an embodiment, the model training component 225 may accumulate reward values calculated whenever a victim map cache line is selected in response to an operation request of the host 300, and train the training model such that the accumulated reward value becomes largest, e.g., until the accumulated reward becomes equal to or greater than a reference value.

Also, the model training component 225 may provide the model controller 223 with an additionally trained victim map cache line selection model TRAINED MODEL corresponding to the training model determined as a result of every predetermined number of trainings. The predetermined number may be variously set in some embodiments. Accordingly, the model controller 223 may select a victim map cache line based on the preprocessed current storage state information PREPROCESSED INFO by using, as the actual victim map cache line selection model, the additionally trained victim map cache line selection model TRAINED MODEL from a time at which the additionally trained victim map cache line selection model TRAINED MODEL is provided to the model controller 223.

In other words, the victim map cache line selector 220 may include the actual victim map cache line selection model and the training model and update the actual victim map cache line selection model with the additionally trained victim map cache line selection model TRAINED MODEL that corresponds to the training model determined as a result of every predetermined number of trainings.

Figure 7:
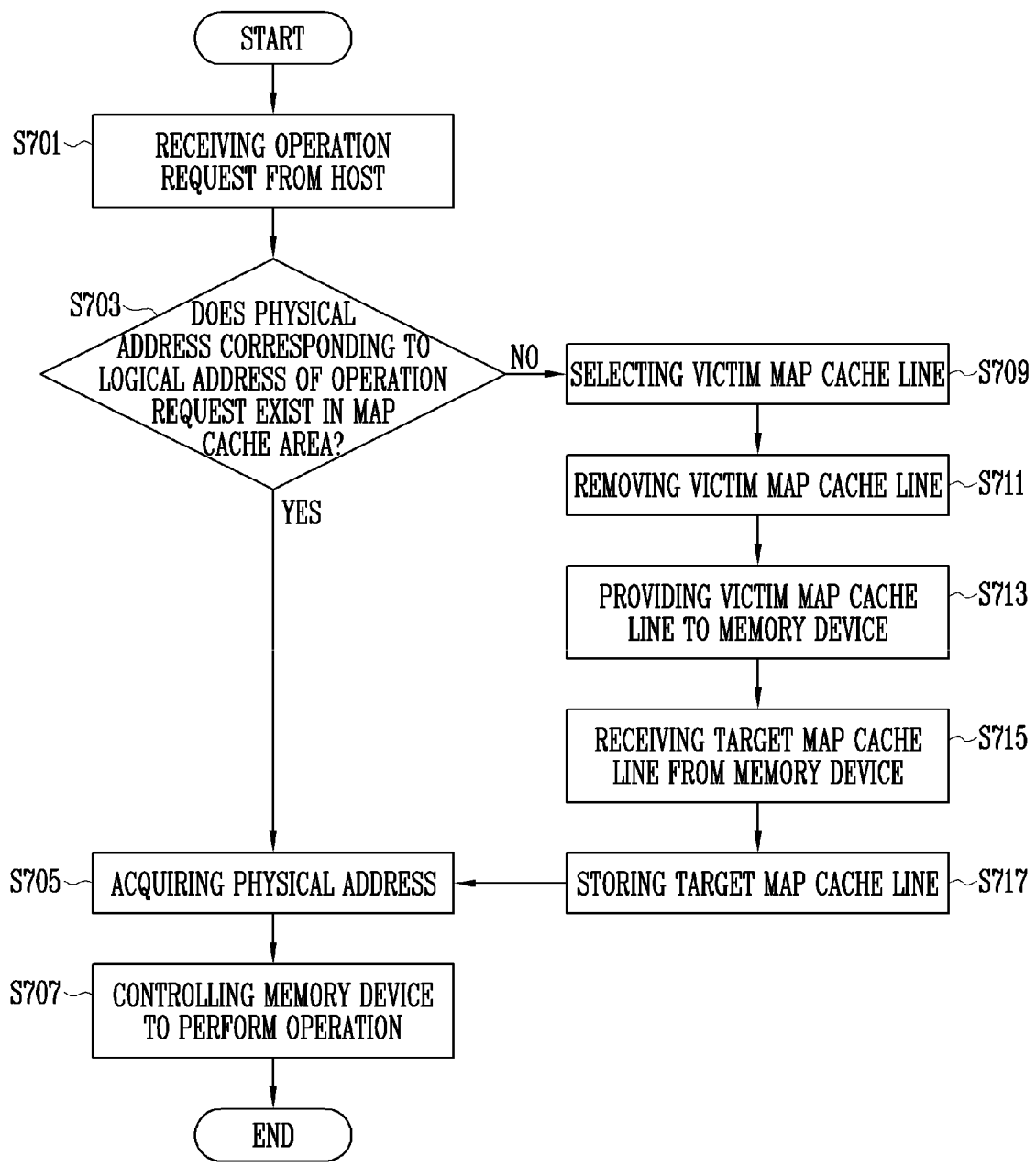
FIG. 7 is a diagram illustrating an operating method of a memory controller in accordance with an embodiment of the present disclosure.

FIG. 7 illustrates an operating method of a memory controller in accordance with an embodiment of the present disclosure.

The operating method shown in FIG. 7 may be performed by, for example, the memory controller 200 shown in FIGS. 1 and 4.

Referring to FIG. 7, in step S701, the memory controller 200 may receive an operation request from the host 300.

In step S703, the memory controller 200 may determine whether a physical address corresponding to a logical address of the operation request exists in the map cache area 210. For example, the memory controller 200 may search for mapping information corresponding to the logical address in the map cache area 210. When the mapping information corresponding to the logical address exists in the map cache area 210, the memory controller 200 may perform step S705.

In the step S705, the memory controller 200 may acquire the physical address corresponding to the logical address of the operation request from the map cache area 210.

In step S707, the memory controller 200 may control the memory device 100 to perform an operation corresponding to the operation request based on the acquired physical address.

On the other hand, when it is determined in the step 703 that the mapping information corresponding to the logical address does not exist in the map cache area 210, the memory controller 200 may perform step S709.

In the step S709, the memory controller 200 may select a victim map cache line to be removed from the map cache area 210 among a plurality of map cache lines included in the map cache area 210, using a victim map cache line selection model.

In step S711, the memory controller 200 may remove the victim map cache line from the map cache area 210.

In step S713, the memory controller 200 may provide the victim map cache line to the memory device 100.

In step S715, the memory controller 200 may receive a target map cache line including the physical address corresponding to the logical address of the operation request from the memory device 100.

In step S717, the memory controller 200 may store the target map cache line in the map cache area 210. Subsequently, in the step S705, the memory controller 200 may acquire the physical address corresponding to the logical address of the operation request from the target map cache line. Subsequently, in the step S707, the memory controller 200 may control the memory device 100 to perform the operation corresponding to the operation request based on the acquired physical address.

Figure 8:
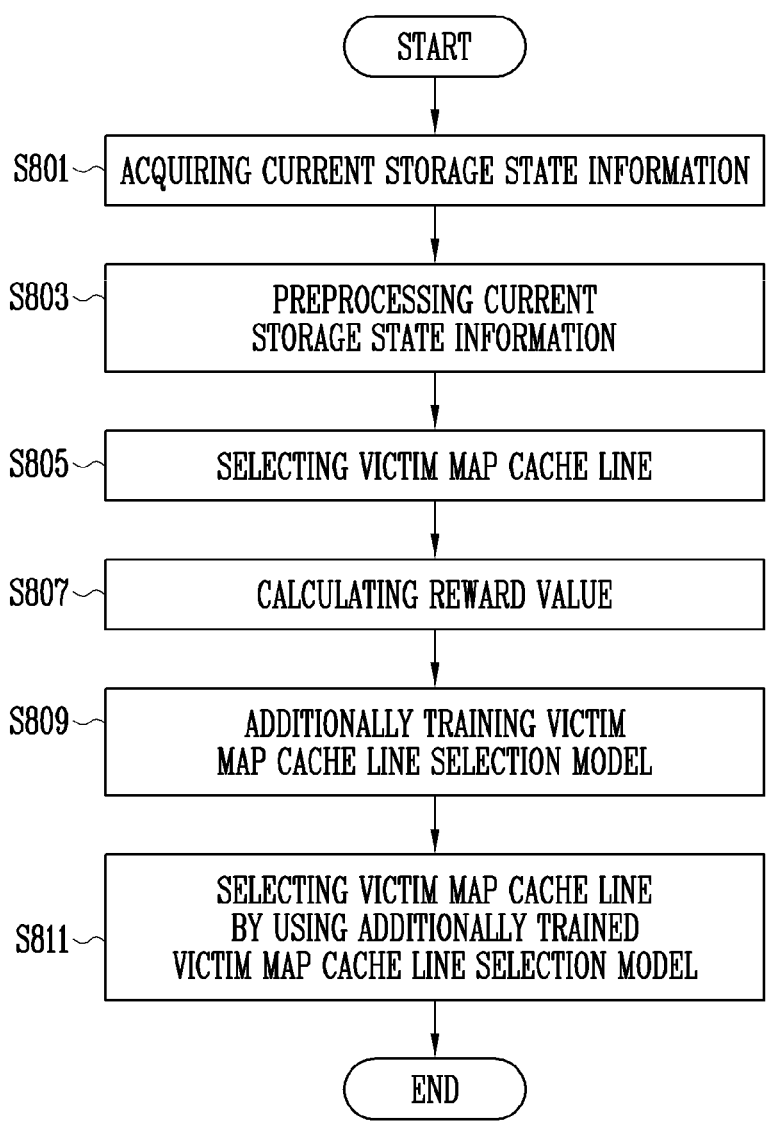
FIG. 8 is a diagram illustrating a method for selecting a victim map cache line in accordance with an embodiment of the present disclosure.

FIG. 8 illustrates a method for selecting a victim map cache line in accordance with an embodiment of the present disclosure.

The method shown in FIG. 8 may be used to specify the step S709 shown in FIG. 7.

The method shown in FIG. 8 may be performed by, for example, the memory controller 200 shown in FIGS. 1 and 4. In an embodiment, the method shown in FIG. 8 may be performed by the victim map cache line selector 220 shown in FIG. 6.

Referring to FIGS. 6 and 8, in step S801, the memory controller 200, e.g., the storage state information acquirer 221, may acquire current storage state information STORAGE STATE INFO. The current storage state information STORAGE STATE INFO may represent a storage state of the storage device 50 at a time at which it is determined that the physical address corresponding to the logical address of the operation request does not exist in the map cache area 210.

In step S803, the memory controller 200, e.g., the preprocessor 222, may preprocess the current storage state information STORAGE STATE INFO.

In step S805, the memory controller 200, e.g., the model controller 223, may select a victim map cache line based on the preprocessed current storage state information PREPROCESSED INFO, using a victim map cache line selection model.

In step S807, the memory controller 200, e.g., the reward calculator 224, may calculate a reward value REWARD to be used for training the victim map cache line selection model, based on information SELECT CL INFO on the selected victim map cache line and information TARGET CL INFO on a target map cache line.

In step S809, the memory controller 200, e.g., the model training component 225, may additionally train the victim map cache line selection model based on the reward value REWARD.

The memory controller 200, e.g., the model training component 225, may accumulate reward values calculated whenever a victim map cache line is selected in response to an operation request of the host 300. Also, the memory controller 200, e.g., the model training component 225, may additionally train the victim map cache line selection model such that the accumulated reward value becomes largest.

In step S811, the memory controller 200, e.g., the model controller 223, may select the victim map cache line based on the preprocessed current storage state information PREPROCESSED INFO by using the additionally trained victim map cache line selection model for every predetermined number of trainings.

Figure 9:
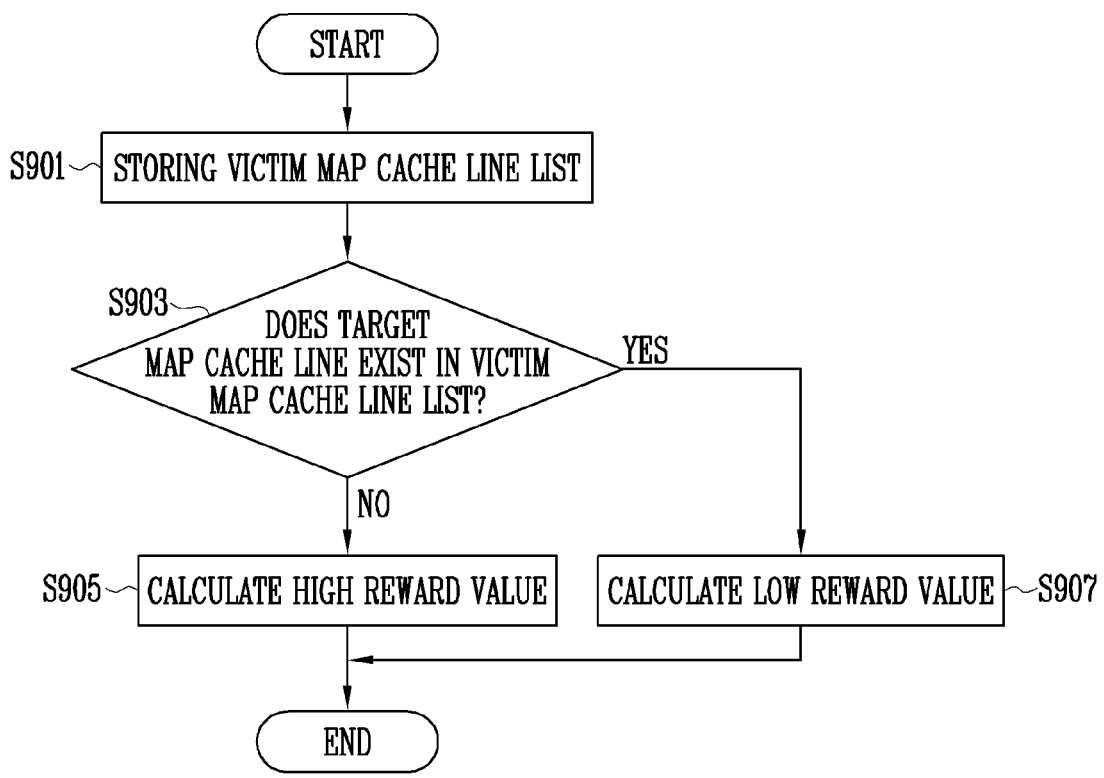
FIG. 9 is a diagram illustrating a method for calculating a reward value in accordance with an embodiment of the present disclosure.

FIG. 9 illustrates a method of calculating a reward value in accordance with an embodiment of the present disclosure.

The method shown in FIG. 9 may be used to specify the step S807 shown in FIG. 8.

The method shown in FIG. 9 may be performed by, for example, the memory controller 200 shown in FIGS. 1 and 4. In an embodiment, the method shown in FIG. 9 may be performed by the victim map cache line selector 220 shown in FIG. 6.

Referring to FIG. 9, in step S901, the memory controller 200 may store a victim map cache line list including information on previous victim map cache lines selected by a victim map cache line selection model when a predetermined number of previous operation requests are provided by the host 300.

In step S903, the memory controller 200 may determine whether a target map cache line exists in the victim map cache line list.

In an embodiment, the memory controller 200 may calculate a reward value according to whether the target map cache line exists in the victim map cache line list. For example, when the target map cache line does not exist in the victim map cache line list, in step S905, the memory controller 200 may provide a high reward value. On the other hand, when the target map cache line exists in the victim map cache line list, in step S907, the memory controller 200 may provide a low reward value.

Figure 10:
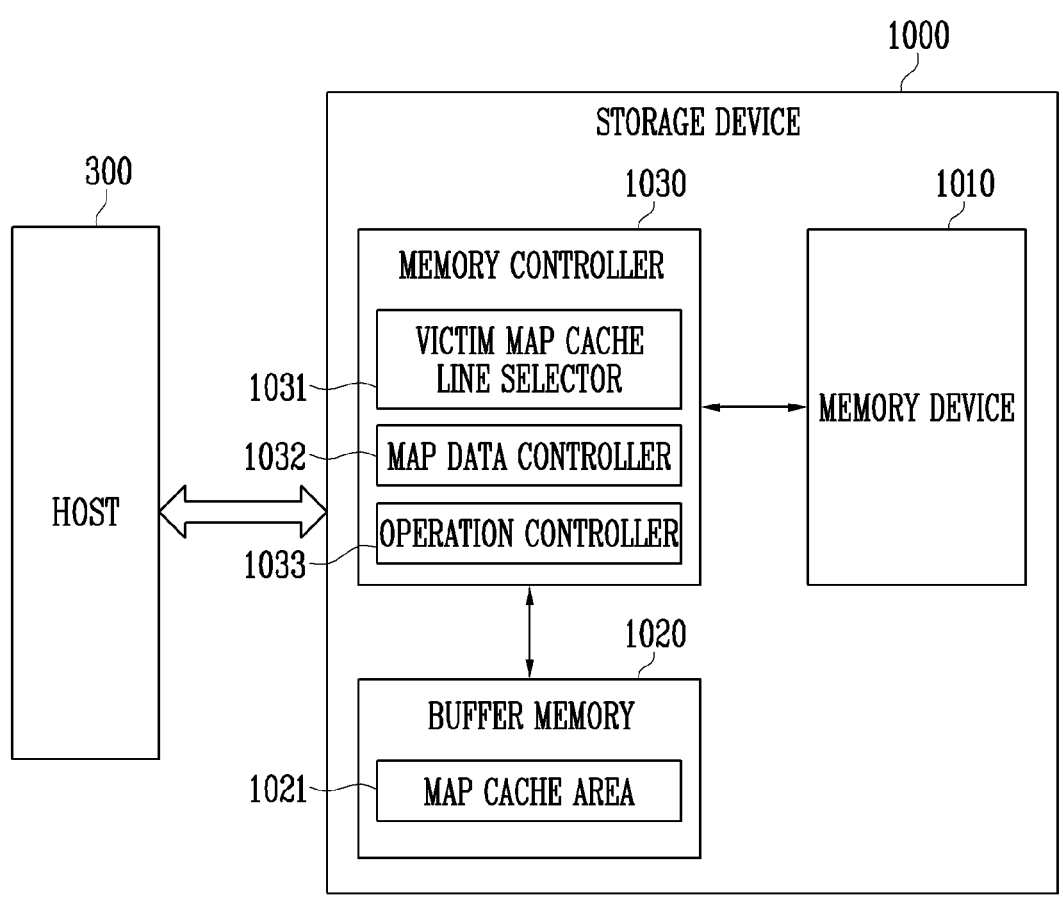
FIG. 10 is a diagram illustrating a storage device in accordance with another embodiment of the present disclosure.

FIG. 10 illustrates a storage device 1000 in accordance with another embodiment of the present disclosure.

As compared with the storage device 50 shown in FIG. 1, the storage device 1000 may represent an embodiment in which a map cache area 1021 is included in a buffer memory 1020 rather than in a memory controller 1030.

Referring to FIG. 10, the storage device 1000 may include a memory device 1010, the buffer memory 1020, and the memory controller 1030.

Operations of the storage device 50, the memory device 100, and the memory controller 200, which have been described with reference to FIG. 1, may be equally applied to the storage device 1000, the memory device 1010, and the memory controller 1030, which are shown in FIG. 10.

The memory device 1010 may store map data including mapping information between a logical address provided by the host 300 and a physical address of the memory device 1010.

The buffer memory 1020 may temporarily store data to be stored in the memory device 1010 or data read from the memory device 1010. For example, the buffer memory 1020 may be a volatile memory device.

The buffer memory 1020 may include the map cache area 1021. The map cache area 1021 may include a plurality of map cache lines for storing a portion of the map data stored in the memory device 1010. The operation of the map cache area 210 described with reference to FIGS. 1 and 4 may be equally applied to the map cache area 1021 shown in FIG. 10. Since the buffer memory 1020 has an operation speed relatively higher than that of the memory device 1010, the buffer memory 1020 can more rapidly acquire a physical address corresponding to a logical address at which the memory controller 1030 is to perform an operation requested by the host 300, when the map data is pre-stored in the buffer memory 1020. Thus, the storage device 1000 can use a partial area of the buffer memory 1020 as a kind of cache memory for the map data.

The memory controller 1030 may include a victim map cache line selector 1031, a map data controller 1032, and an operation controller 1033. The operations of the victim map cache selector 220, the map data controller 230, and the operation controller 240, which have been described with reference to FIGS. 1 and 4, may be equally applied to the victim map cache line selector 1031, the map data controller 1032, and the operation controller 1033, which are shown in FIG. 10.

For example, the memory controller 1030 may control the memory device 1010 and the buffer memory 1020. In an embodiment, when a physical address corresponding to a logical address of an operation request provided by the host 300 does not exist in the map cache area 1021, the memory controller 1030 may select a victim map cache line to be removed from the map cache area 1021 among the plurality of map cache lines, using a victim map cache line selection model. Also, the memory controller 1030 may remove the victim map cache line from the map cache area 1021 and provide the victim map cache line to the memory device 1010. Also, the memory controller 1030 may control the memory device 1010 and the buffer memory 1020 to receive a target map cache line including the physical address corresponding to the logical address of the operation request from the memory device 1010 and to store the target map cache line in the map cache area 1021.

The operation of the storage device 1000 shown in FIG. 10 will be described in detail with reference to FIG. 11.

Figure 11:
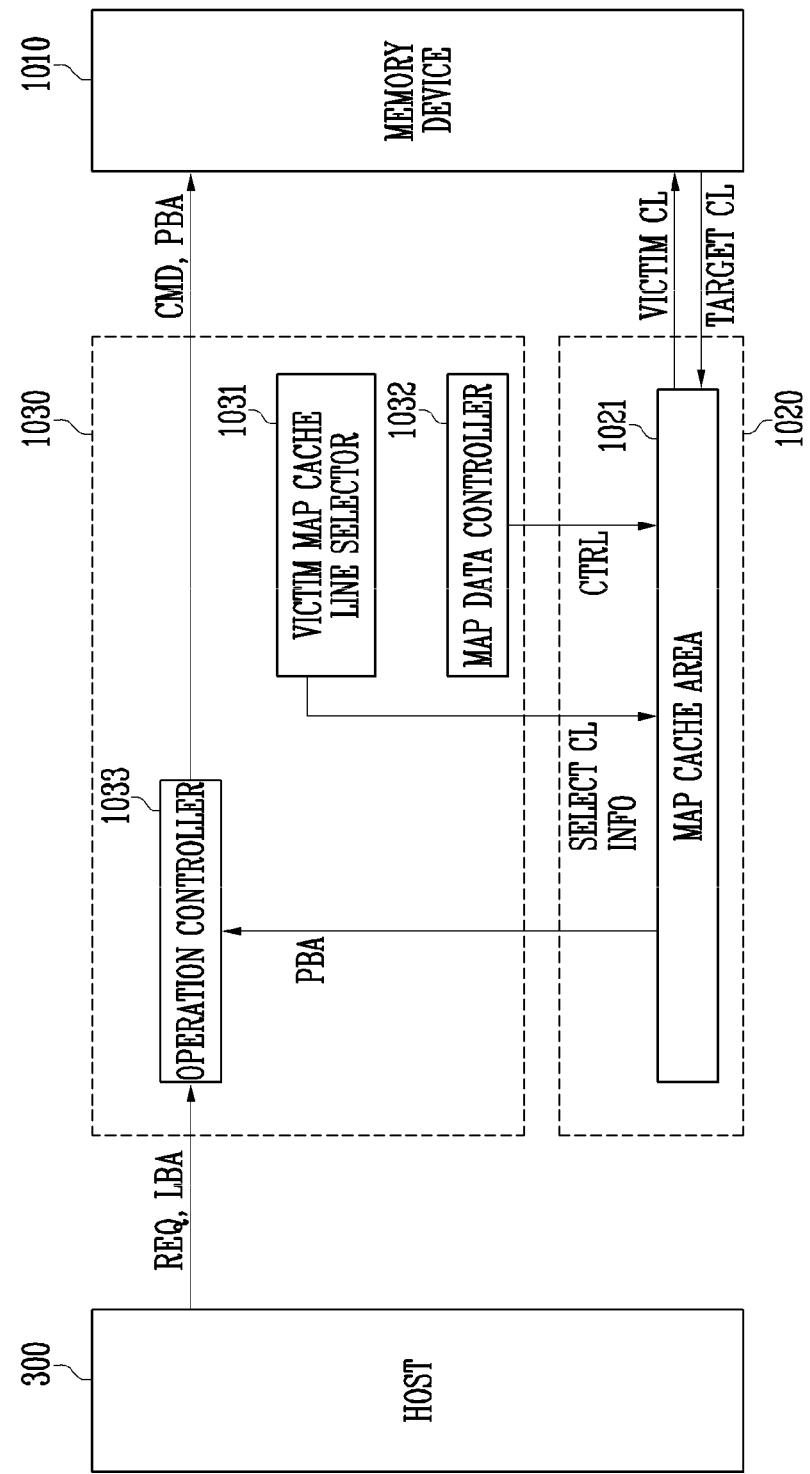
FIG. 11 is a diagram illustrating an operation of the storage device shown in FIG. 10.

FIG. 11 illustrates the operation of the storage device 1000 shown in FIG. 10.

The storage device 50 shown in FIG. 1 and the storage device 1000 shown in FIG. 10 are different from each other according to whether the buffer memory 1020 exists. Therefore, the storage device 50 shown in FIG. 1 and the storage device 1000 shown in FIG. 10 may be slightly different from each other in a direction in which data or a signal is transmitted/received. However, descriptions of an operation of selecting a victim map cache line, an operation of removing the victim map cache line, an operation of training a victim map cache line selection model, and the like, which are described in this specification, may be equally applied to the storage device 50 shown in FIG. 1 and the storage device 1000 shown in FIG. 10.

Referring to FIG. 11, the map cache area 1021 included in the buffer memory 1020 may store a plurality of map cache lines.

The victim map cache line selector 1031 included in the memory controller 1030 may select a victim map cache line VICTIM CL when a physical address PBA corresponding to a logical address LBA of an operation request REQ provided by the host 300 does not exist in the map cache area 1021. For example, the victim map cache line selector 1031 may select the victim map cache line VICTIM CL from among the plurality of map cache lines, using a victim map cache line selection model. The operation request REQ may include a request for a program operation, a request for an erase operation, a request for a read operation, or the like.

In an embodiment, the victim map cache line selection model may be a machine learning-based model trained by using a plurality of storage state information as training data. For example, the victim map cache line selection model may be a model trained by using the reinforcement learning that has been described with reference to FIG. 5. Specifically, the victim map cache line selection model may receive current storage state information as state information and output a victim map cache line as action information.

The storage state information may include various information representing a state of the storage device 1000. Hereinafter, the state of the storage device 1000 may be designated as a storage state. For example, the storage state information may include one or more of a logical address of an operation request, a size of data corresponding to the operation request, a type of an operation corresponding to the operation request, an interval at which operation requests are received from the host 300, information on whether a physical address corresponding to the logical address of the operation request has existed in the map cache area 1021, information of a cache-hit map cache line among the plurality of map cache lines in the map cache area 1021, a number of times the plurality of map cache lines are accessed, a number of map cache lines storable in the map cache area 1021, a frequency of an operation of removing the selected victim map cache line from the map cache area 1021, and the like. Meanwhile, a description of the above-described storage state information is merely an example, and the storage state information may further include various other information associated with the storage state in addition to the above-described examples.

The storage state information may be different from each other for every time at which the storage state information is input to the victim map cache line selection model. For example, the current storage state information may represent a storage state when a physical address PBA PAB corresponding to a logical address LBA provided with a current operation request REQ does not exist in the map cache area 1021. Storage state information corresponding to a previously provided operation request may represent a storage state when a physical address corresponding to a logical address provided with the previously provided operation request does not exist in the map cache area 1021.

The victim map cache line selector 1031 may train the victim map cache line selection model by using training data. In an embodiment, the training data of the victim map cache line selection model may include a plurality of storage state information. The plurality of storage state information may include storage state information corresponding to each of operation requests previously provided by the host 300.

An initial victim map cache line selection model may be a model pre-trained by using arbitrary training data.

Meanwhile, descriptions of the victim map cache line selector 220 shown in FIG. 6 may be equally applied to the victim map cache line selector 1031. Therefore, the method of training the victim map cache line selection model of the victim map cache line selector 220 described with reference to FIG. 6 may be equally applied to the victim map cache line selector 1031.

In an embodiment, the victim map cache line selector 1031 may provide the map cache area 1021 with information SELECT CL INFO on the selected victim map cache line.

The map data controller 1032 included in the memory controller 1030 may control the map cache area 1021 using a control signal CTRL. For example, the map data controller 1032 may control the map cache area 1021 to remove the victim map cache line VICTIM CL from the map cache area 1021 and to provide the memory device 1010 with the victim map cache line VICTIM CL. Also, the map data controller 1032 may control the map cache area 1021 to receive a target map cache line TARGET CL from the memory device 1010 and to store the target map cache line TARGET CL therein. The target map cache line TARGET CL may be a map cache line including the physical address PBA corresponding to the logical address LBA of the operation request REQ.

The operation controller 1033 included in the memory controller 1030 may acquire the physical address PBA corresponding to the logical address LBA from the plurality of map cache lines of the map cache area 1021 in response to the operation request REQ. Alternatively, when the physical address PBA corresponding to the logical address LBA of the operation request REQ does not exist in the map cache area 1021, the operation controller 1033 may acquire the physical address PBA corresponding to the logical address LBA from the target map cache line TARGET CL.

Also, the operation controller 1033 may control the memory device 1010 to perform an operation corresponding to the operation request REQ based on the acquired physical address PBA. For example, the operation controller 1033 may generate a command CMD instructing an operation corresponding to the operation request REQ, and provide the memory device 1010 with the command CMD and the physical address PBA.

Figure 12:
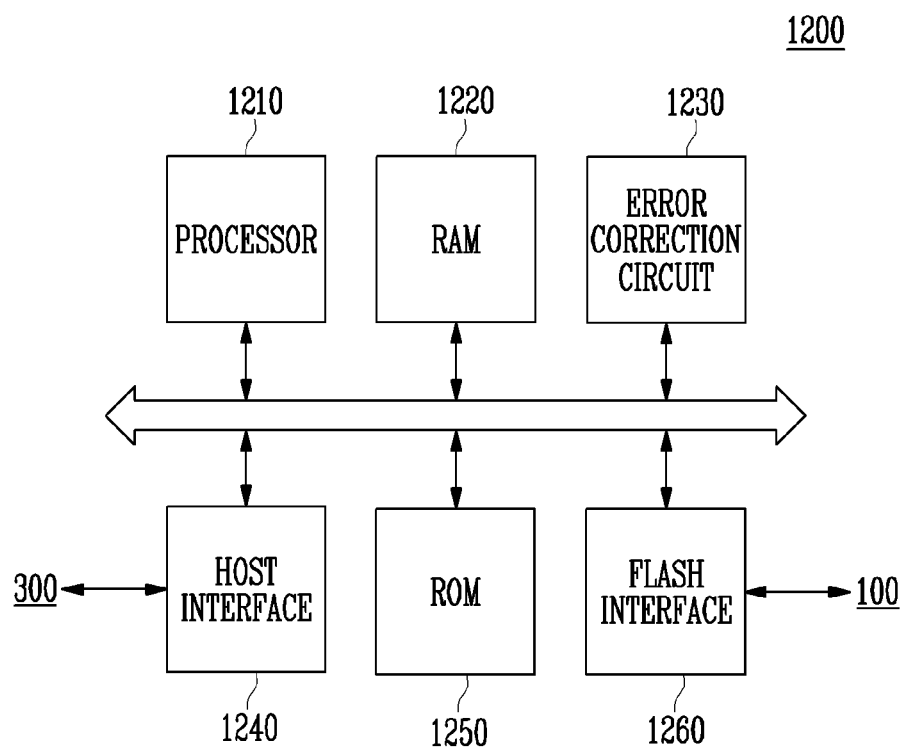
FIG. 12 is a diagram illustrating a memory controller.

FIG. 12 is a diagram illustrating a memory controller 1200.

The memory controller 1200 shown in FIG. 12 may correspond to the memory controller 200 shown in FIG. 1 or the memory controller 1030 shown in FIG. 10.

Referring to FIG. 12, the memory controller 1200 may include a processor 1210, a RAM 1220, an error correction circuit 1230, ROM 1250, a host interface 1240, and a flash interface 1260.

The processor 1210 may control overall operations of the memory controller 1200. The RAM 1220 may be used as a buffer memory, a cache memory, a working memory, etc. of the memory controller 1200. In an embodiment, the RAM 1220 may include the map cache area 210 shown in FIG. 1.

The error correction circuit 1230 may perform error correction. The error correction circuit 1230 may perform error correction code (ECC) encoding on data to be written to a memory device 100 through the flash interface 1260. The ECC-encoded data may be transferred to the memory device 100 through the flash interface 1260. The error correction circuit 1230 may perform ECC decoding on data received from the memory device 100 through the flash interface 1260. Exemplarily, the error correction circuit 1230 may be included as a component of the flash interface 1260 in the flash interface 1260.

The ROM 1250 may store, in the form of firmware, various information required in an operation of the memory controller 1200.

The memory controller 1200 may communicate with an external device (e.g., a host 300, an application processor, or the like) through the host interface 1240.

The memory controller 1200 may communicate with the memory device 100 through the flash interface 1260. The memory controller 1200 may transmit a command, an address, a control signal, and the like to the memory device 100 through the flash interface 1260, and receive data DATA from the memory device 100. Exemplarily, the flash interface 1260 may include a NAND interface when the memory device 100 is a NAND flash memory.

Figure 13:
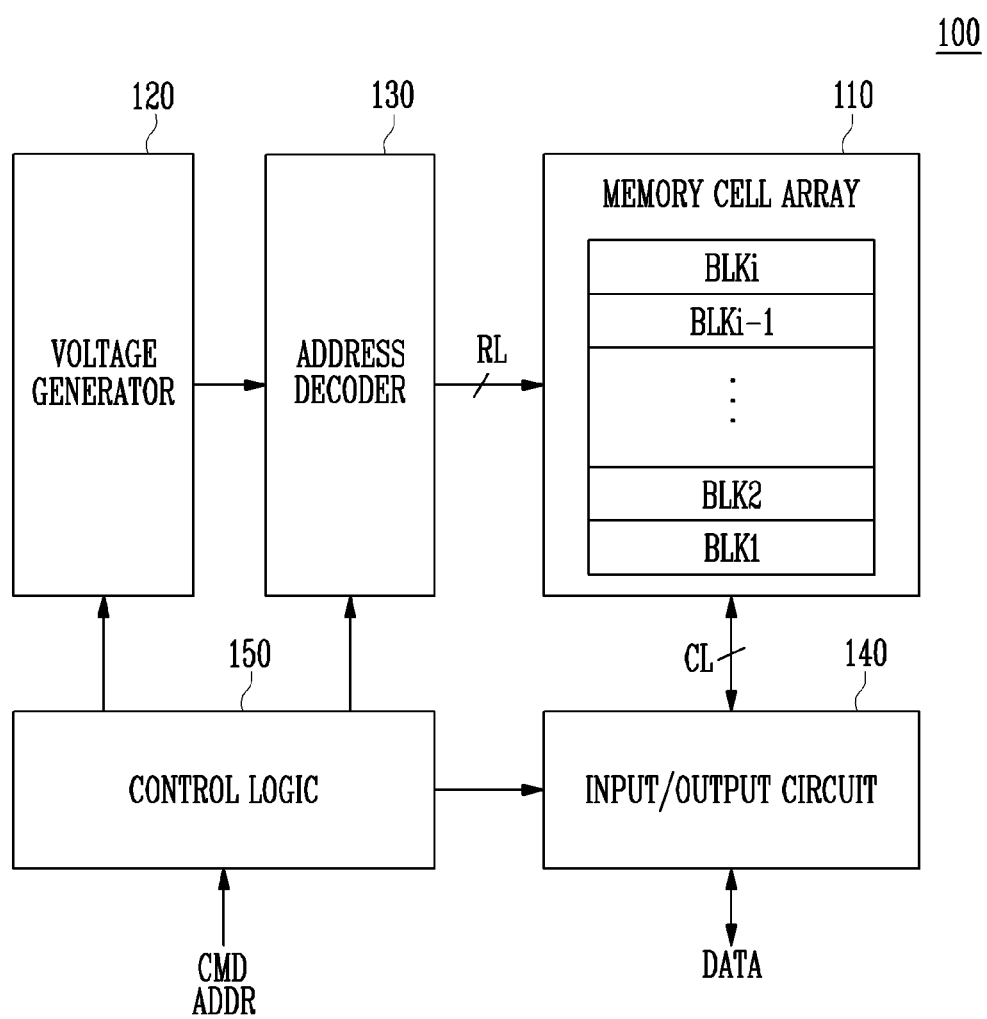
FIG. 13 is a diagram illustrating a memory device.

FIG. 13 is a diagram illustrating a memory device 100. The memory device 100 shown in FIG. 13 may correspond to the memory device 100 shown in FIG. 1 or the memory device 1010 shown in FIG. 10.

Referring to FIG. 13, the memory device 100 may include a memory cell array 110, a voltage generator 120, an address decoder 130, an input/output circuit 140, and a control logic 150.

The memory cell array 110 may include a plurality of memory blocks BLK1 to BLKi. The plurality of memory blocks BLK1 to BLKi may be connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a Single Level Cell (SLC) storing one-bit data, a Multi-Level Cell (MLC) storing two-bit data, a Triple Level Cell (TLC) storing three-bit data, or a Quad Level Cell (QLC) storing four-bit data.

Some of the plurality of memory blocks BLK1 to BLKi may be map data blocks storing the map data described with reference to FIG. 1. The other of the plurality of memory blocks BLK1 to BLKi may be normal blocks storing data which the host 300 requests.

In an embodiment, the voltage generator 120, the address decoder 130, and the input/output circuit 140 may be commonly designated as a peripheral circuit. The peripheral circuit may drive the memory cell array 110 under the control of the control logic 150. The peripheral circuit may driver the memory cell array 110 to perform a program operation, a read operation, and an erase operation.

The voltage generator 120 may generate a plurality of operating voltages by using an external power voltage supplied to the memory device 100. The voltage generator 120 may operate under the control of the control logic 150.

In an embodiment, the voltage generator 120 may generate an internal power voltage by regulating the external power voltage. The internal power voltage generated by the voltage generator 120 may be used as an operating voltage of the memory device 100.

In an embodiment, the voltage generator 120 may generate a plurality of operating voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 120 may include a plurality of pumping capacitors which receive the internal power voltage. The voltage generator 120 may generate the plurality of operating voltages by selectively activating the plurality of pumping capacitors under the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may operate under the control of the control logic 150. The address decoder 130 may receive an address ADDR from the control logic 150. The address decoder 130 may decode a block address in the received address ADDR. The address decoder 130 may select at least one memory block among the memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the input/output circuit 140 and the memory cell array 110 to each other according to the decoded column address.

In accordance with an embodiment of the present disclosure, in a read operation, the address decoder 130 may apply a read voltage to the selected word line, and apply a read pass voltage having a level higher than that of the read voltage to unselected word lines.

Exemplarily, the address decoder 130 may include components such as a row decoder, a column decoder, and an address decoder.

The input/output circuit 140 may include a plurality of page buffers. The plurality of page buffers may be connected to the memory cell array 110 through the bit lines. In a program operation, data stored in the plurality of page buffer may be provided to a selected physical page through the bit lines, and the provided data may be stored in memory cells included in the selected physical page. In a read operation, data stored in the memory cells included in the selected physical page may be sensed through the bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating control signals in response to the command CMD and the address ADDR.

Figure 14:
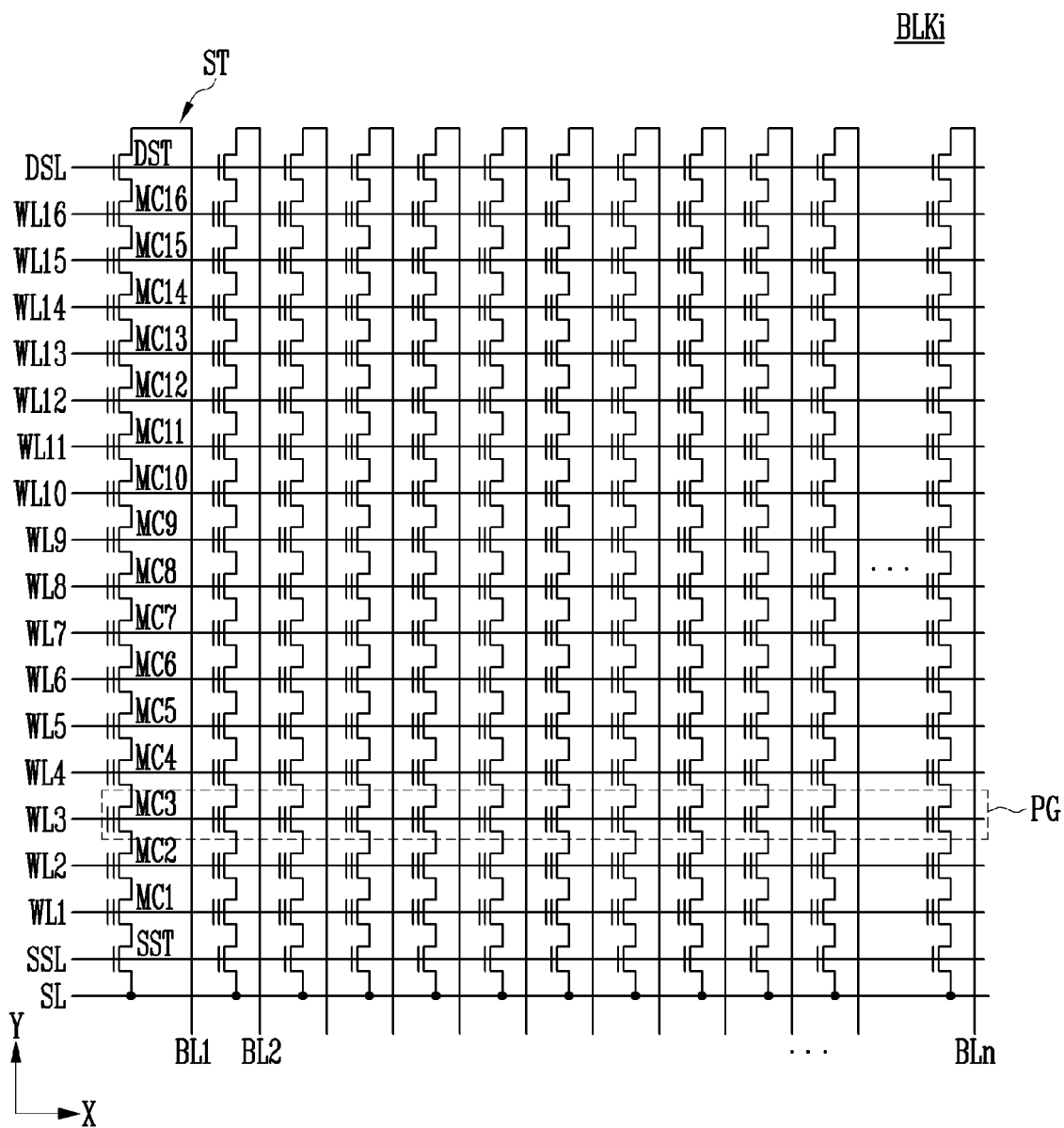
FIG. 14 is a diagram illustrating a memory block.

FIG. 14 is a diagram illustrating a structure of any one memory block among the memory blocks shown in FIG. 13.

A memory block BLKi represents any one memory block BLKi among the memory blocks BLK1 to BLKi shown in FIG. 13.

Referring to FIG. 14, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one drain select transistor DST may be included in one string ST, and source select transistors of which a number is greater than that of the source select transistor SST shown in the drawing and memory cells of which a number is greater than that of the memory cells MC1 to MC16 shown in the drawing may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PG. Therefore, physical pages PG corresponding to the number of the word lines WL1 to WL16 may be included in the memory block BLKi.

One memory cell may store one-bit data. The one memory cell is generally referred to as a single level cell (SLC). One physical page PG may store one logical page (LPG) data. One LPG data may include data bits corresponding to the number of cells included in the one physical page PG.

One memory cell may store two or more-bit data. One physical page PG may store two or more LPG data.

Figure 15:
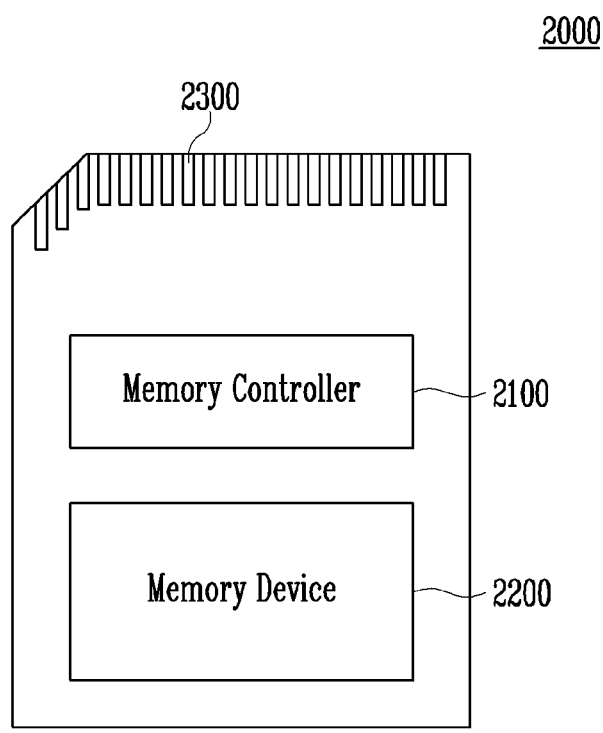
FIG. 15 is a block diagram illustrating a memory card system to which the storage device in accordance with the embodiment of the present disclosure is applied.

FIG. 15 is a block diagram illustrating a memory card system 2000 to which the storage device in accordance with the embodiment of the present disclosure is applied.

Referring to FIG. 15, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may control read, write, erase, and background operations of the memory device 2200. The memory controller 2100 provides an interface between the memory device 2200 and a host Host. The memory controller 2100 drives firmware for controlling the memory device 2200. The memory controller 2100 may be implemented identically to the memory controller 200 described with reference to FIG. 1. The memory device 2200 may be implemented identically to the memory device 100 described with reference to FIG. 1.

Exemplarily, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. Exemplarily, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 2300 may be defined by at least one of the above-described various communication protocols.

Exemplarily, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 16:
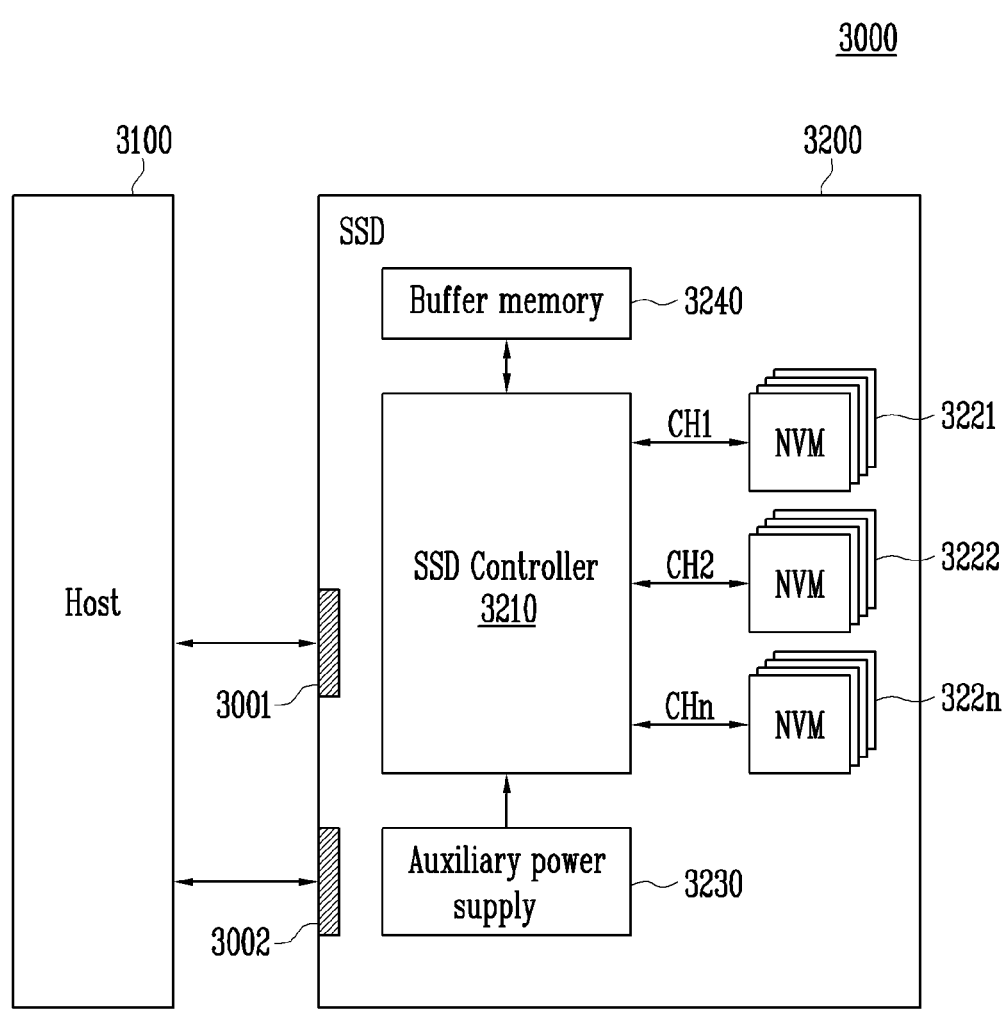
FIG. 16 is a block diagram illustrating a Solid State Drive (SSD) system to which the storage device in accordance with the embodiment of the present disclosure is applied.

FIG. 16 is a block diagram illustrating a Solid State Drive (SSD) system 3000 to which the storage device in accordance with the embodiment of the present disclosure is applied.

Referring to FIG. 16, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. Exemplarily, the signal may be a signal based on an interface between the host 3100 and the SSD 3200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. The auxiliary power supply 3230 may receive the power PWR input from the host 3100, and charge the power PWR. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 17:
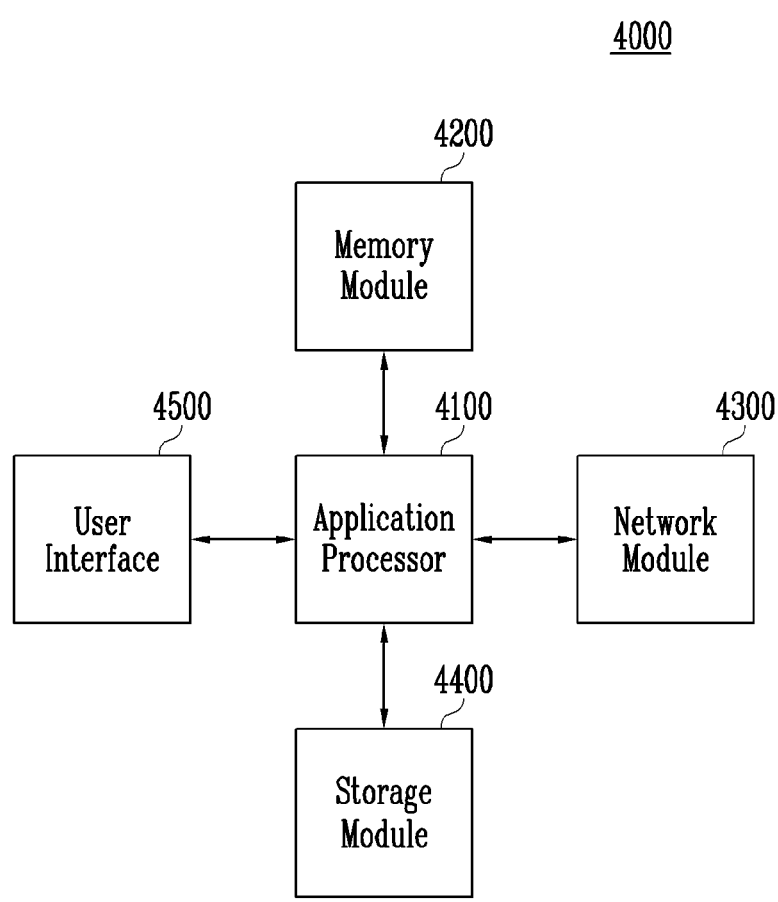
FIG. 17 is a block diagram illustrating a user system to which the storage device in accordance with the embodiment of the present disclosure is applied.

FIG. 17 is a block diagram illustrating a user system 4000 to which the storage device in accordance with the embodiment of the present disclosure is applied.

Referring to FIG. 17, the user system 4000 includes an application processor 4100, a memory module 4200, a network module 4300, a storage module 4400, and a user interface 4500.

The application processor 4100 may drive components included in the user system 4000, an operating system (OS), a user program, or the like. Exemplarily, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 4100 and the memory module 4200 may be provided as one semiconductor package by being packaged based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. Exemplarily, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a memory controller capable of improving the performance of a storage device by minimizing a map data loading operation, and an operating method of the memory controller.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a memory device, the memory controller comprising:
    a map cache area configured to store a plurality of map cache lines including mapping information between a logical address provided by a host and a physical address of the memory device;
    a victim map cache line selector configured to select a victim map cache line to be removed from the map cache area among the plurality of map cache lines, using a victim map cache line selection model when a physical address corresponding to a logical address of an operation request provided by the host is absent in the map cache area, the victim map cache line selection model being trained by using a plurality of storage state information as training data; and
    a map data controller configured to remove the selected victim map cache line from the map cache area, provide the removed victim map cache line to the memory device, receive a target map cache line including the physical address corresponding to the logical address of the operation request from the memory device, and store the target map cache line in the map cache area,
    wherein the victim map cache line selector comprises a model training component configured to accumulate reward values calculated whenever the victim map cache line is selected in response to operation requests of the host, and trains the victim map cache line selection model based on an accumulated reward value.

2. The memory controller of claim 1, wherein the victim map cache line selection model is a reinforcement learning-based model, which receives, as state information, current storage state information including information representing a current storage state when the physical address corresponding to the logical address is absent in the map cache area and outputs the victim map cache line as action information.

3. The memory controller of claim 2, wherein the current storage state information includes one or more of the logical address of the operation request, a size of data corresponding to the operation request, a type of an operation corresponding to the operation request, an interval at which the operation requests are received from the host, information on whether the physical address corresponding to the logical address has been acquired from the map cache area, information of a cache-hit map cache line among the plurality of map cache lines, a number of times the plurality of map cache lines are accessed, a number of map cache lines storable in the map cache area, and a frequency of an operation of removing the selected victim map cache line.

4. The memory controller of claim 1, wherein the plurality of storage state information include storage state information corresponding to each of the operation requests previously provided by the host.

5. The memory controller of claim 1, wherein the victim map cache line selector further includes:
    a storage state information acquirer configured to acquire current storage state information representing a current storage state when the physical address corresponding to the logical address is absent in the map cache area;
    a preprocessor configured to preprocess the current storage state information;
    a model controller configured to select the victim map cache line based on the preprocessed current storage state information by using the victim map cache line selection model; and
    a reward calculator configured to calculate a reward value based on information on the selected victim map cache line and information on the target map cache line.

6. The memory controller of claim 5, wherein the reward calculator stores a victim map cache line list including information on previous victim map cache lines selected by the victim map cache line selection model while a predetermined number of previous operation requests are provided by the host.

7. The memory controller of claim 6, wherein the reward calculator determines the reward value according to whether the target map cache line exists in the victim map cache line list.

8. The memory controller of claim 5, wherein the model training component trains the victim map cache line selection model such that the accumulated reward value becomes equal to or greater than a reference value.

9. The memory controller of claim 5, wherein the model training component additionally trains the victim map cache line selection model based on a predetermined number of trainings and provides the model controller with the additionally trained victim map cache line selection model, and
    wherein the model controller selects the victim map cache line based on the preprocessed current storage state information by using the additionally trained victim map cache line selection model.

10. The memory controller of claim 1, further comprising:
    an operation controller configured to acquire the physical address corresponding to the logical address of the operation request provided by the host from the map cache area in response to the operation request when the physical address corresponding to the logical address of the operation request exists in the map cache area, acquire the physical address corresponding to the logical address of the operation request from the target map cache line when the physical address corresponding to the logical address of the operation request is absent in the map cache area, and control the memory device to perform an operation corresponding to the operation request based on the physical address.

11. A method of operating a memory controller including a map cache area for storing a plurality of map cache lines, the method comprising:
- acquiring current storage state information;
- preprocessing the current storage state information;
- selecting a victim map cache line from among the plurality of map cache lines based on the preprocessed current storage state information, using a victim map cache line selection model that is trained by using a plurality of storage state information as training data, the victim map cache line being to be removed from the map cache area;
- accumulating reward values calculated whenever the victim map cache line is selected in response to operation requests of a host; and
- additionally training the victim map cache line selection model based on an accumulated reward value.

12. The method of claim 11, wherein the current storage state information includes information representing a storage state when a physical address corresponding to a logical address of an operation request provided by the host is absent in the map cache area.

13. The method of claim 12, wherein the current storage state information includes one or more of the logical address of the operation request, a size of data corresponding to the operation request, a type of an operation corresponding to the operation request, an interval at which the operation requests are received from the host, information on whether the physical address corresponding to the logical address of the operation request has been acquired from the map cache area, information of a cache-hit map cache line among the plurality of map cache lines, a number of times the plurality of map cache lines are accessed, a number of map cache lines storable in the map cache area, and a frequency of an operation of removing the selected victim map cache line.

14. The method of claim 11, wherein the plurality of storage state information include storage state information corresponding to each of the operation requests previously provided by the host.

15. The method of claim 11, further comprising:
- removing the selected victim map cache line from the map cache area;
- providing the removed victim map cache line to a memory device;
- receiving, from the memory device, a target map cache line including a physical address corresponding to a logical address of an operation request provided by the host; and
- storing the target map cache line in the map cache area.

16. The method of claim 15, further comprising:
- calculating a reward value based on information on the selected victim map cache line and information on the target map cache line.

17. The method of claim 16, wherein the calculating includes:
- storing a victim map cache line list including information on previous victim map cache lines selected by the victim map cache line selection model while a predetermined number of previous operation requests are received from the host; and
- determining the reward value according to whether the target map cache line exists in the victim map cache line list.

18. The method of claim 17, wherein the additionally training includes:
- training the victim map cache line selection model such that the accumulated reward value becomes equal to or greater than a reference value.

19. The method of claim 18, further comprising selecting the victim map cache line based on the preprocessed current storage state information by using the additionally trained victim map cache line selection model that is determined for every predetermined number of trainings.

20. A storage device, comprising:
- a memory device configured to store map data including mapping information between a logical address provided by a host and a physical address thereof;
- a buffer memory including a map cache area configured to store a plurality of map cache lines including a portion of the map data; and
- a memory controller configured to select a victim map cache line from among the plurality of map cache lines using a victim map cache line selection model trained by using a plurality of storage state information as training data, when a physical address corresponding to a logical address of an operation request provided by the host is absent in the map cache area, remove the selected victim map cache line from the map cache area and then provide the removed victim map cache line to the memory device, and control the buffer memory to receive, from the memory device, a target map cache line including the physical address corresponding to the logical address of the operation request and then store the received target map cache line in the map cache area,
- wherein the memory controller comprises a model training component configured to accumulate reward values calculated whenever the victim map cache line is selected in response to operation requests of the host, and trains the victim map cache line selection model based on an accumulated reward value.

* * * * *